US012421926B2

(12) United States Patent
Blanc et al.

(10) Patent No.: US 12,421,926 B2
(45) Date of Patent: Sep. 23, 2025

(54) METHOD FOR PRODUCING A COMBINED FILTRATION AND CALIBRATION ASSEMBLY

(71) Applicant: DELPHI TECHNOLOGIES IP LIMITED, St. Michael (BB)

(72) Inventors: Jean-Etienne Blanc, Blois (FR); Philippe Legrand, St. Gervais la Foret (FR)

(73) Assignee: PHINIA JERSEY HOLDINGS LLC, Wilmington, DE (US)

(*) Notice: Subject to any disclaimer, the term of this patent is extended or adjusted under 35 U.S.C. 154(b) by 506 days.

(21) Appl. No.: 17/629,010

(22) PCT Filed: Jul. 22, 2020

(86) PCT No.: PCT/EP2020/070650
§ 371 (c)(1),
(2) Date: Jan. 21, 2022

(87) PCT Pub. No.: WO2021/013879
PCT Pub. Date: Jan. 28, 2021

(65) Prior Publication Data

US 2022/0268247 A1 Aug. 25, 2022

(30) Foreign Application Priority Data

Jul. 23, 2019 (FR) ....................................... 1908332

(51) Int. Cl.

| | |
|---|---|
| ***B23P 11/00*** | (2006.01) |
| ***F02M 61/16*** | (2006.01) |
| *F02M 51/06* | (2006.01) |

(52) U.S. Cl.
CPC ........ *F02M 61/165* (2013.01); *F02M 61/168* (2013.01); *F02M 51/0685* (2013.01); *F02M 2200/27* (2013.01); *F02M 2200/28* (2013.01); *F02M 2200/505* (2013.01); *F02M 2200/8053* (2013.01)

(58) Field of Classification Search
CPC ............... F02M 61/165; F02M 61/168; F02M 51/0685; F02M 2200/27; F02M 2200/28; F02M 2200/505; F02M 2200/8053; F02M 61/1853
See application file for complete search history.

(56) References Cited

FOREIGN PATENT DOCUMENTS

| | | | |
|---|---|---|---|
| DE | 10232691 | A1 | 2/2004 |
| DE | 102005033157 | A1 | 1/2007 |
| DE | 102015226528 | A1 | 6/2017 |

(Continued)

OTHER PUBLICATIONS

English translation of WO-2010119896-A1 (Year: 2010).*

(Continued)

*Primary Examiner* — Jun S Yoo
(74) *Attorney, Agent, or Firm* — WARNER NORCROSS + JUDD LLP

(57) ABSTRACT

A combined assembly for filtering and calibrating a fuel injector arranged in an internal combustion engine, the combined filtration and calibration assembly extending along a longitudinal axis and comprising a calibration sleeve provided with a longitudinal bore and defining a multitude of filtration holes. The combined filtration and calibration assembly has a calibrated opening in the bore.

1 Claim, 6 Drawing Sheets

(56) References Cited

FOREIGN PATENT DOCUMENTS

| | | | | | |
|---|---|---|---|---|---|
| EP | 1219818 | A1 | | 7/2002 | |
| EP | 1783356 | B1 | | 10/2007 | |
| EP | 2811151 | A1 | * | 12/2014 | ........... F02M 61/165 |
| EP | 3034857 | A1 | | 6/2016 | |
| EP | 3279462 | A1 | | 2/2018 | |
| JP | 2010167351 | A | | 8/2010 | |
| WO | WO-2010119896 | A1 | * | 10/2010 | ............. B21D 41/00 |
| WO | WO-2018024714 | A1 | * | 2/2018 | ......... F02M 51/0682 |

OTHER PUBLICATIONS

English translation of International Search Report for PCT/EP2020/070650 dated Oct. 16, 2020, 3 pages.

Machine assisted English translation of DE10232691A1 obtained from https://patents.google.com/patent on Jan. 20, 2022, 6 pages.

Machine assisted English translation of DE102005033157A1 obtained from https://patents.google.com/patent on Jan. 20, 2022, 4 pages.

Machine assisted English translation of JP2010167351A1 obtained from https://patents.google.com/patent on Jan. 20, 2022, 9 pages.

Machine assisted English translation of DE102015226528A1 obtained from https://patents.google.com/patent on Jan. 20, 2022, 6 pages.

* cited by examiner

METHOD FOR PRODUCING A COMBINED FILTRATION AND CALIBRATION ASSEMBLY

TECHNICAL FIELD

The present invention relates to a fuel injector and in particular to a fuel injector intended for a direct injection of gasoline into the combustion chamber of an internal combustion engine.

TECHNOLOGICAL BACKGROUND OF THE INVENTION

The direct injection gasoline engines require the fuel injectors to operate under extreme conditions of temperature and pressure. In addition, the fuel injector must open and close very quickly in order to provide multi-pulse injection cycles necessary for the energy efficiency and the low emissions.

The current direct injection fuel injectors use either inward opening valves (nozzle or multi-hole type) in conjunction with the actuation of the solenoid or of the outward opening valves using the piezoelectric actuation. The outward opening piezoelectrically-actuated injector has demonstrated the greatest potential for reducing the fuel consumption, but the cost of the conductor's piezoelectric actuator is prohibitive for the high volume applications.

The piezoelectric actuator can provide a high opening force to overcome the return spring of the needle required to keep the valve closed and the high hydraulic forces generated during high pressure operation of the injector. The piezoelectric actuator also provides a rapid opening of the valve and can create a variable valve. However, the piezoelectric fuel injectors are very expensive to make compared to the solenoid-actuated injectors and require complex and expensive control systems for the operation of the piezoelectric actuator.

In contrast, the solenoid-actuated fuel injectors as described in EP1783356 are much cheaper to make. However, the known solenoid-actuated fuel injectors cannot provide the same level of performance as the devices actuated by piezoelectric apparatuses, mainly due to the lower opening force achievable by the electromagnetic solenoid actuators and the slower increase of the force over time.

The known solenoid-actuated fuel injectors use an armature spring to ensure its return to its rest position, that is, the closure of the injector. The armature spring is a return spring which is arranged above an armature. However, the position of the armature spring is not optimized because it reduces the air gap between the armature and the pole piece and thus reduces the magnetic force available to attract the armature.

As described in FIGS. 1 and 2 of an existing injector 10, the injector 10 comprises an electromagnetic actuator 12, a body 14, a needle 16 comprising an integral ball 18, a calibration spring 20 and an armature spring 22. The electromagnetic actuator 12 comprises a fixed coil 24, a pole piece 26 and an armature 28. The method for operating the injector 10 not shown comprises:

- a rest step in which the actuator 12 is unpowered, the assembly consisting of the needle 16 and the ball 18 is in contact with a seat and the injector 10 is closed. There is no fuel injection.
- a pre-opening step in which the actuator 12 is powered, the pole piece 26 attracts the armature 28, the calibration spring 20 and the armature spring 22 are compressed. The armature 28 drives the needle 16 and the ball 18 upwards, the needle 16 and the ball 18 being distant from the seat and the injector 10 is open. There is fuel injection.
- an opening step in which the actuator 12 is powered, the armature 28 continues to move towards the pole piece 26, the calibration spring 20 and the armature spring 22 continue to be compressed.
- a closing step in which the actuator 12 is unpowered, the assembly consisting of the needle 16 and the ball 18 is in contact with the seat and the injector 10 is closed. There is no fuel injection.

The injector 10 further comprises a stop ring 30, a calibration sleeve 32 and a filter 34. The assembly of the various pieces of the injector 10 in production is complex and generates rejects during the mounting, in particular of a stop ring 30. In addition, the insertion of the stop ring 30 and of the calibration sleeve 32 generates particles which are sources of degradation of the injection in operation. The filter 34 is made of plastic or of stainless steel mesh. In addition, the filter 34 is mounted at the end of the assembly line of the injector 10 and therefore the generation of particles upstream cannot be prevented.

The object of the present invention is to provide a solution which will alleviate the above-mentioned problem.

SUMMARY OF THE INVENTION

The present invention aims to overcome the drawbacks mentioned above by proposing a simple and economical solution which aims to reduce the number of assembled pieces by producing a single piece which incorporates the calibration sleeve, the stop ring and the filter. The invention consists of a combined filtration and calibration assembly of a fuel injector arranged in an internal combustion engine. The combined filtration and calibration assembly extends along a longitudinal axis. The combined filtration and calibration assembly comprises a calibration sleeve provided with a longitudinal bore as well as a multitude of filtration holes. The combined filtration and calibration assembly has a calibrated orifice in the bore. In addition, the calibrated orifice is produced by lamination. Alternatively, the calibrated orifice is a circular plate provided at its center with a calibrated hole opening on both sides. The circular plate is arranged in the bore of the combined filtration and calibration assembly. In addition, according to the invention, a method for producing a combined filtration and calibration assembly comprises the following production steps:

roll up a tube or deform a plate into a tube
laminate the calibrated orifice
drill filtration holes using a laser According to the alternative to the invention, a production method comprises the following production steps:

roll up a tube
insert the circular plate into the tube
crimp the circular plate
drill filtration holes using a laser.

Furthermore, according to the invention, a fuel injector comprises a combined filtration and calibration assembly as described above.

BRIEF DESCRIPTION OF THE DRAWINGS

Other characteristics, aims and advantages of the invention will become apparent on reading the detailed description which follows, and with reference to the appended drawings, given by way of non-limiting example and in which.

DESCRIPTION OF THE PREFERRED EMBODIMENTS

The invention is now described with reference to the figures and for the sake of clarity and conciseness of the description, an orientation from top to bottom according to the direction of FIG. 3 will be used without any limiting intention as to the extent of the protection, in particular with regard to the various installations of an injector in a vehicle. Words such as "up, down, below, above, vertical, move up, move down . . . " will be used without limiting intent.

Figure 1:
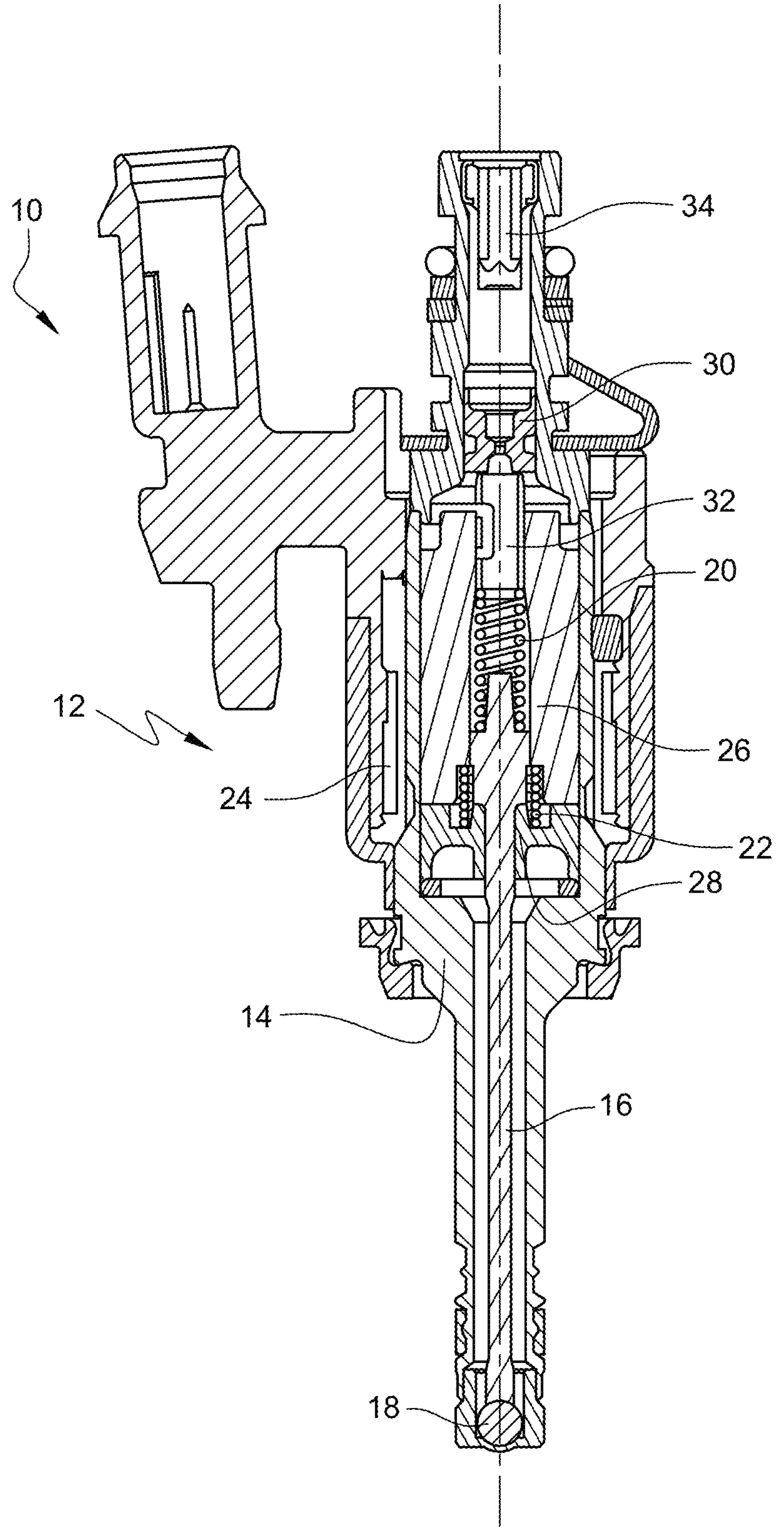
Fig. 1 Prior Art
FIG. 1 is a cross-sectional view of an injector of the prior art.
Figure 2:
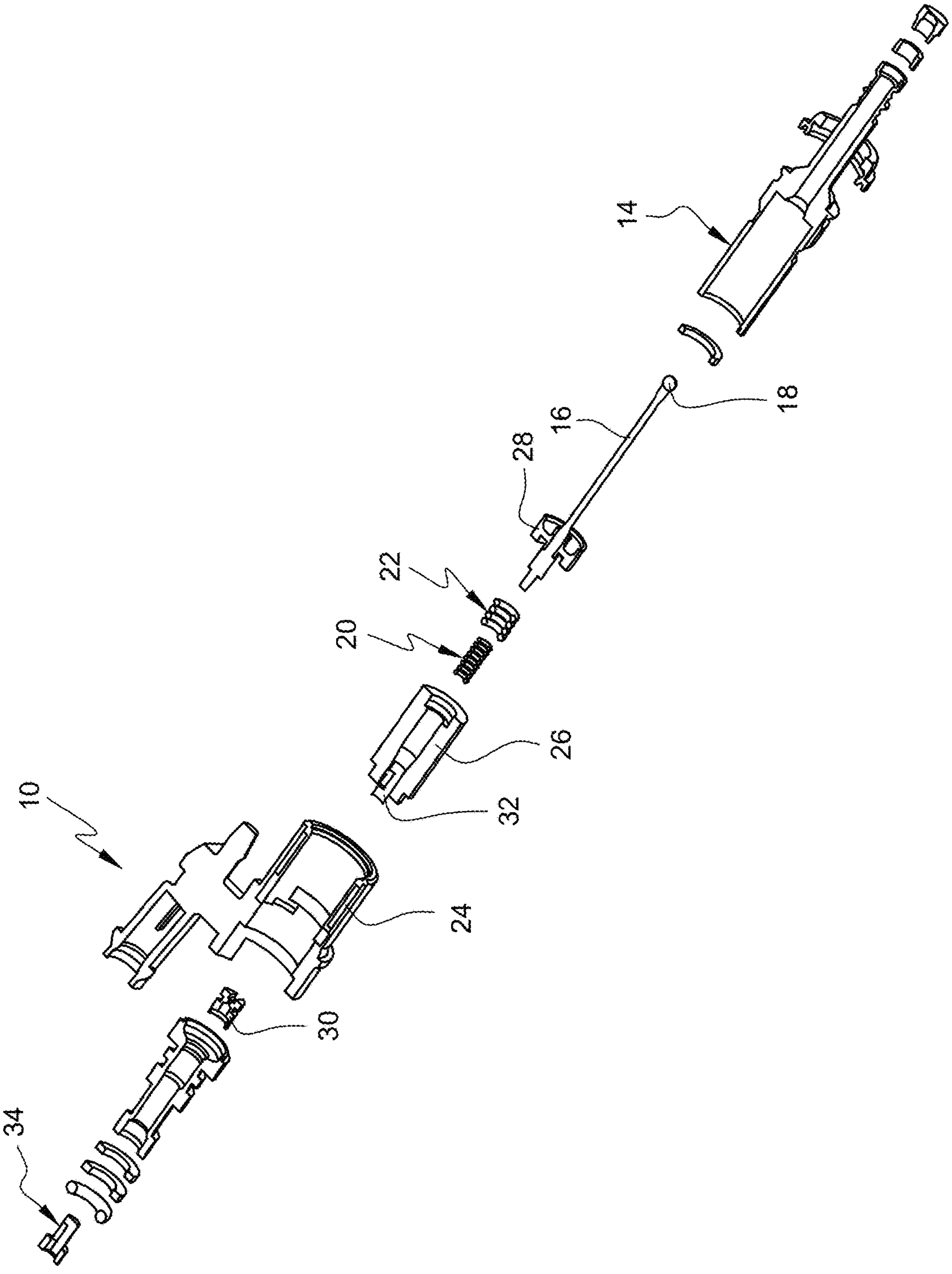
Fig. 2 Prior Art
FIG. 2 is a cross-sectional view of an injector of the prior art.
Figure 3:
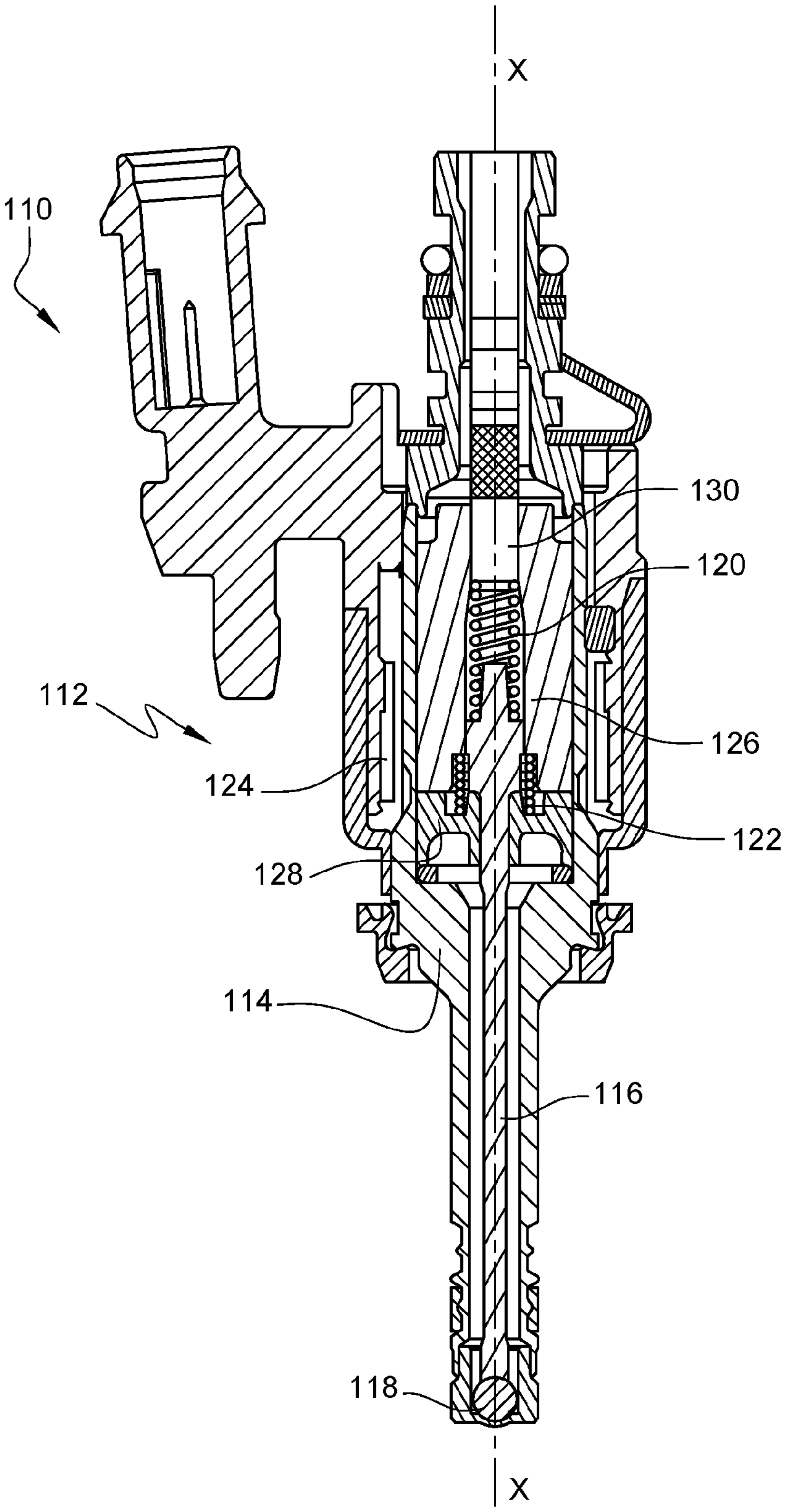
FIG. 3 is a cross-sectional view of an injector according to the invention.

As shown in FIG. 3, the invention relates to a fuel injector 110 for an internal combustion engine, here the injector 110 is a gasoline injector. The description will detail the elements of the invention and will remain more succinct and general as to the surrounding elements.

According to FIG. 3, the injector 110 extends along a longitudinal axis X. The injector 110 is a gasoline injector for an internal combustion engine. The injector 110 comprises an electromagnetic actuator 112, a body 114, a needle 116 with a ball 118 integral with the needle 116, a calibration spring 120 and an armature spring 122 and a combined filtration and calibration assembly 130.

The body 114 of the injector 110 comprises an open upper end and a lower end provided with an injection nozzle. The body 114 extends along the X axis.

The electromagnetic actuator 112 comprises an annular fixed coil 124, a fixed pole piece 126 and an armature 128. The movable armature 128 is provided with an axial hole inside which the needle 116 is axially slidably guided.

The needle 116 is axially movable in the body 114 between a closed position and an open position of the injection nozzle. The needle 116 comprises a first end arranged with the ball 118 and a second end arranged close to the pole piece 126.

The armature spring 122 is fixed at one end to the armature 128 and at the other end to the needle 116. The armature spring 122 is a tension spring with contiguous turns at ends thereof. The armature spring 122 is a return spring.

Figure 4:
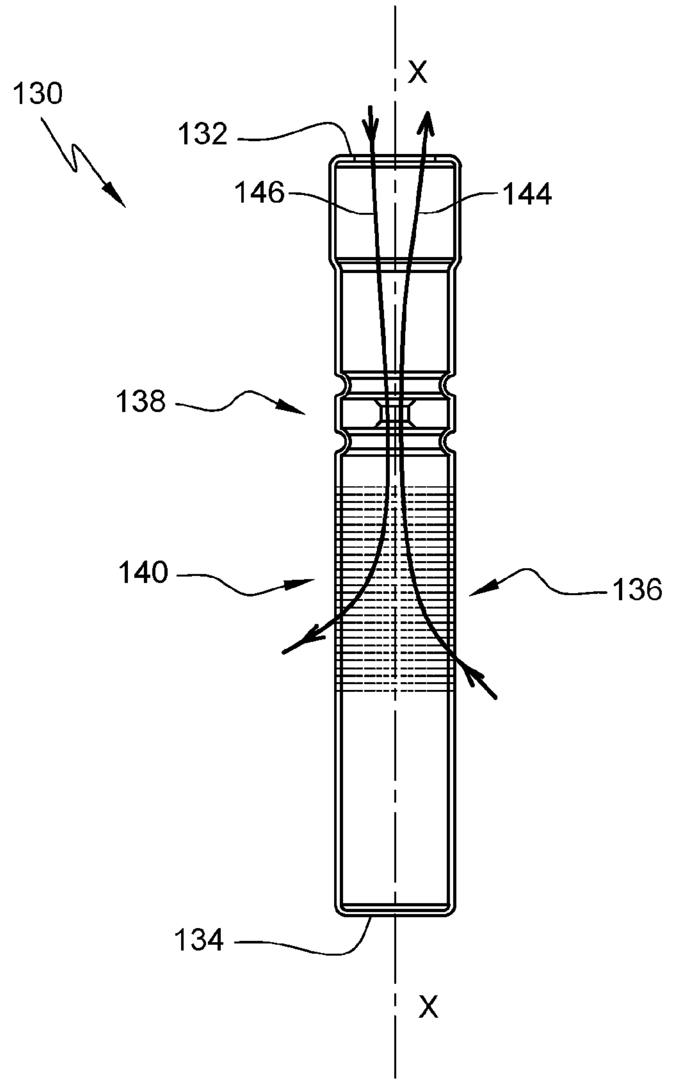
FIG. 4 is a cross-sectional view of a combined filtration and calibration assembly according to the invention.

As described in FIGS. 3 and 4, the combined filtration and calibration assembly 130 of the injector 110 extends along the longitudinal axis X. The combined filtration and calibration assembly 130 additionally comprises a lower face 132 and an upper face 134. The lower 132 and upper 134 faces can be used as an adjustment face of the calibration spring 120. The combined filtration and calibration assembly 130 comprises a calibration sleeve provided with a longitudinal bore and provided with a multitude of filtration holes 136. The combined filtration and calibration assembly 130 has a calibrated orifice 138 in the bore. The calibrated orifice 138 is a circular plate provided at its center with a calibrated hole opening on both sides. The circular plate is arranged in the bore of the combined filtration and calibration assembly 130. The combined filtration and calibration assembly 130 comprises a filtering section 140 comprising the filtration holes 136 laser drilled in the body of a deep-drawn part. In FIG. 4 are shown a fuel stream 144 which indicates the flow direction of the fuel in the injector 110 of GDI M14 type and a fuel stream 146 indicating the flow of fuel in the injector 110 of GDI M16 type.

Figure 5:
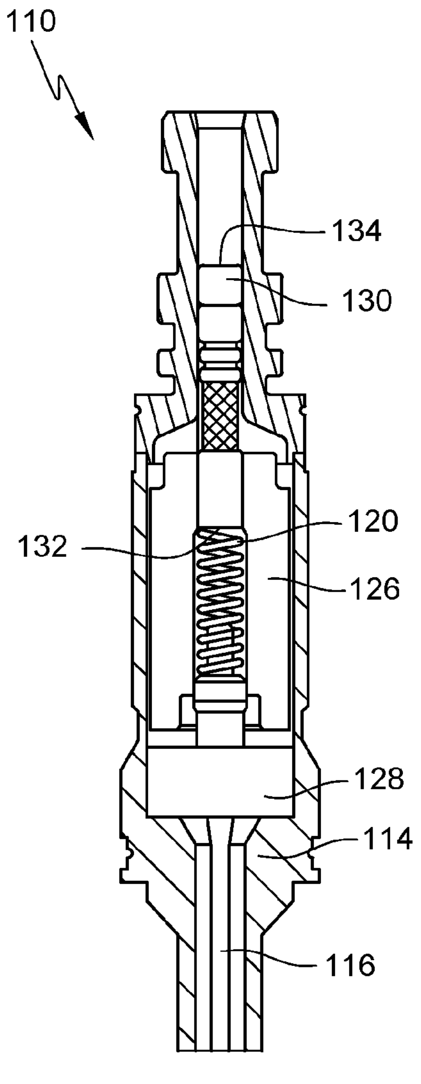
FIG. 5 is a cross-sectional view of an injector named GDI M14 according to the invention.
Figure 6:
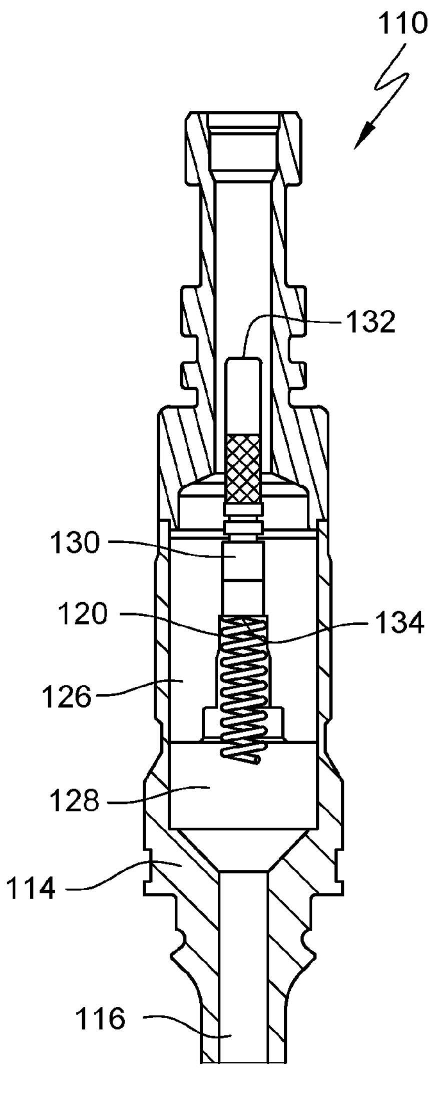
FIG. 6 is a cross-sectional view of an injector named GDI M12 according to the invention.

In FIG. 5 the injector 110 named GDI M14. The combined filtration and calibration assembly 130 is mounted with the lower face 132 oriented downward and arranged against the calibration spring 120 while the upper face 134 is oriented upward. The combined filtration and calibration assembly 130 is mounted tightly in an upper part of the injector 110. In FIG. 6, the injector 110 named GDI M12 or GDI M16. The combined filtration and calibration assembly 130 is mounted upside down with respect to the mounting of the injector 110 described in FIG. 5. In FIG. 6, the upper face 134 is arranged against the calibration spring 120 while the lower face 132 is arranged in the top part of the injector 110. The combined filtration and calibration assembly 130 is mounted tightly in a lower part of the injector 130, on the calibration spring 120 side.

In a not shown alternative of the invention described in FIGS. 5 and 6, the filtering section 140 comprising the laser-drilled filtration holes 136 can be set to an equivalent calibrated orifice size 138. The calibrated orifice 138 serves for the fuel stream by managing the pressure drop and the pressure waves. The diameter of the filtration hole 136 is comprised between 20 μm and 25 μm and the number of filtration holes is comprised between 600 and 2800 filtration holes 136 required for the calibrated orifice 138 equivalent to 0.7 mm in diameter. The calibrated orifice 138 may be an add-on part or an integrated feature created from a restriction 142 of the body of the combined filtration and calibration assembly 130. The advantage is that a resting volume is created for the retention of particles, thus minimizing the risk of clogging of the filtering section 140. The body of the combined filtration and calibration assembly 130 should be made of stainless steel with the possibility of adding a surface hardening process to strengthen the component but also to prevent seizures during its insertion into the injector 110.

The main advantages expected by the invention are:

simple basic components that can be adjusted like the filtering section 140, the expected reduction in costs, the protection against particles of the assembly process during the mounting and the calibration of the injector 110, the retention volume of the particles in the two mounting positions, the fuel injector 110 is standardized with the calibrated orifice 138 reducing the error in case of use of an orifice plate after standardization.

Figure 7:
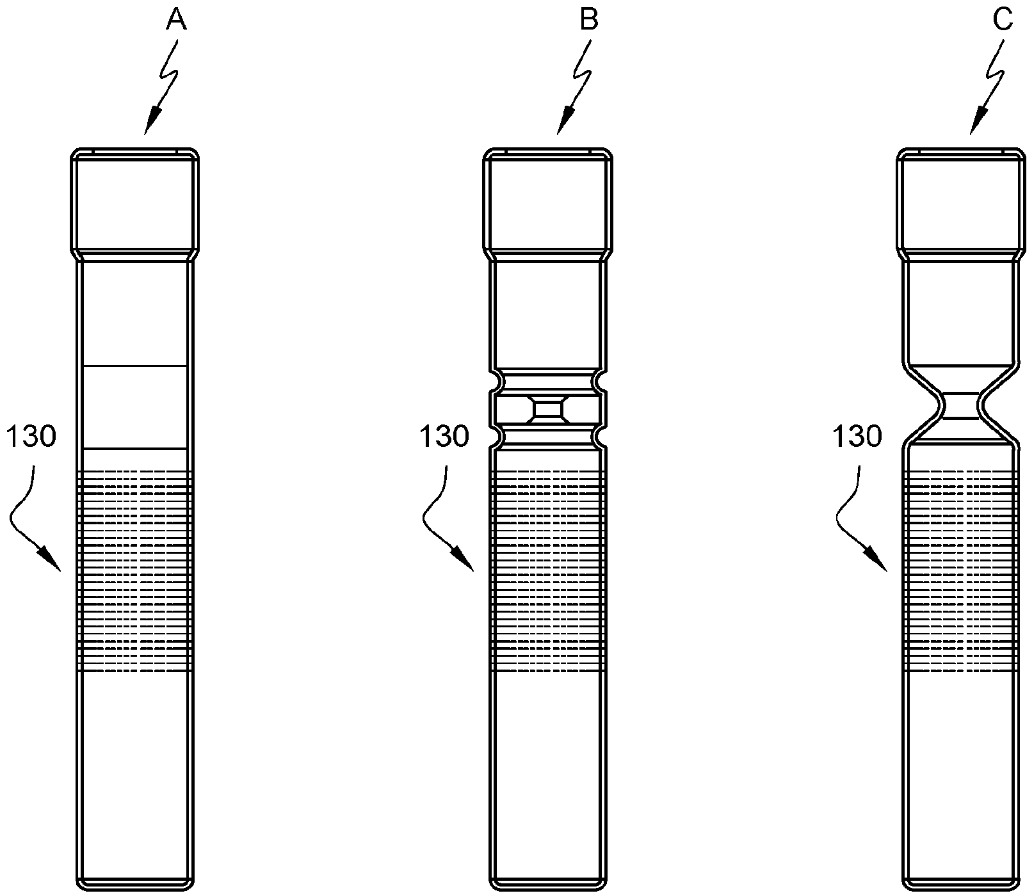
FIG. 7 is a cross-sectional view of the production of the combined filtration and calibration assembly according to the invention on step-by-step basis.

According to FIG. 7, the method for producing the combined filtration and calibration assembly 130 of the invention as described above comprises the production steps which are:

step A: roll up a tube or deform a plate into a tube, step C: laminate the calibrated orifice 138, drill the filtration holes 136 using a laser An alternative to the method for producing the combined filtration and calibration assembly 130 is described below with reference to FIG. 7 and in which the steps of production are:

step A: roll up a tube, step B: insert a circular plate into the tube and crimp the circular plate, drill filtration holes 136 using a laser.

An alternative to drilling holes with a laser by electrochemical dissolution of the material or by electroforming (electroforming or "photoetching").

LIST OF REFERENCES USED

10 injector
12 actuator
14 body
16 needle
18 ball
20 calibration spring
22 armature spring
24 fixed coil
26 pole piece
28 armature
30 stop ring
32 calibration sleeve
34 filter
110 injector
112 actuator
114 body
116 needle
118 ball
120 calibration spring
122 armature spring
124 fixed coil
126 pole piece
128 armature
130 combined filtration and calibration assembly
132 lower face
134 upper face
136 filtration holes
138 calibrated orifice
140 filtering section
142 restriction
144 fuel direction for injector named GDI M14
146 fuel direction for injector named GDI M16
X longitudinal axis
A roll up a tube or deform a plate into a tube
B insert a circular plate into the tube and crimp the circular plate
C laminate the calibrated orifice

The invention claimed is:

1. A method for producing a combined filtration and calibration assembly of a fuel injector arranged in an internal combustion engine, the combined filtration and calibration assembly extending along a longitudinal axis and comprising a single calibration sleeve provided with a longitudinal bore and defining a multitude of filtration holes, the combined filtration and calibration assembly having a calibrated orifice in the bore, said method comprising, in the following order, the steps of:

rolling up a tube made of stainless steel to form said calibration sleeve with said longitudinal bore;

inserting a circular plate into the tube, said calibrated orifice being provided at a center of said circular plate with a calibrated hole opening on both sides of said circular plate;

crimping the circular plate; and then subsequent to the steps of rolling up the tube, inserting the circular plate into the tube, and crimping the circular plate, performing the step of drilling the filtration holes using a laser.

* * * * *